United States Patent
Ren et al.

(10) Patent No.: US 12,117,194 B2
(45) Date of Patent: Oct. 15, 2024

(54) MULTI-SPLIT AIR-CONDITIONING SYSTEM, AND METHOD FOR CALCULATING HEAT EXCHANGE CAPACITY THEREOF

(71) Applicants: Qingdao Haier Air-conditioning Electronic Co., Ltd, Qingdao (CN); Haier Smart Home Co., Ltd., Qingdao (CN)

(72) Inventors: Tao Ren, Qingdao (CN); Qiang Song, Qingdao (CN); Yinyin Li, Qingdao (CN); Jingsheng Liu, Qingdao (CN); Bing Wang, Qingdao (CN)

(73) Assignees: QINGDAO HAIER AIR-CONDITIONING ELECTRONIC CO., LTD, Qingdao (CN); HAIER SMART HOME CO., LTD., Qingdao (CN)

( * ) Notice: Subject to any disclaimer, the term of this patent is extended or adjusted under 35 U.S.C. 154(b) by 723 days.

(21) Appl. No.: 17/256,308

(22) PCT Filed: Jul. 16, 2019

(86) PCT No.: PCT/CN2019/096121
§ 371 (c)(1),
(2) Date: Dec. 28, 2020

(87) PCT Pub. No.: WO2020/164228
PCT Pub. Date: Aug. 20, 2020

(65) Prior Publication Data
US 2021/0262688 A1    Aug. 26, 2021

(30) Foreign Application Priority Data

Feb. 13, 2019    (CN) .......................... 201910112996.8

(51) Int. Cl.
*F24F 11/63* (2018.01)
*G01K 5/30* (2006.01)
(Continued)

(52) U.S. Cl.
CPC ................ *F24F 11/63* (2018.01); *G01K 5/30* (2013.01); *G01K 5/32* (2013.01); *G01K 17/00* (2013.01);
(Continued)

(58) Field of Classification Search
CPC .... F24F 11/63; F24F 2140/00; F24F 2110/40; G01K 5/30; G01K 5/32; G01K 17/00;
(Continued)

(56) References Cited

U.S. PATENT DOCUMENTS 9,933,320 B2 *   4/2018   Meirav ................. G01K 17/06
10,578,329 B2 *  3/2020   Chang .................. G01K 17/06
(Continued)

FOREIGN PATENT DOCUMENTS

CN    103185649 A    7/2013
CN    104006497 A    8/2014
(Continued)

OTHER PUBLICATIONS

International Search Report issued on Nov. 12, 2019 in corresponding International application No. PCT/CN2019/096121; 6 pages.

*Primary Examiner* — Randy W Gibson
(74) *Attorney, Agent, or Firm* — Maier & Maier, PLLC

(57) ABSTRACT

A multi-split air-conditioning system, and a method for calculating a heat exchange capacity thereof. The method includes: acquiring a total heat exchange capacity of a multi-split air-conditioning system; acquiring a pressure difference between two pressure measurement points on each air pipe; acquiring the distance between the two pressure measurement points on each air pipe; acquiring the
(Continued)

pipe diameter of each air pipe; acquiring the friction factor of each air pipe; acquiring the density of a heat exchange medium in each air pipe; and according to the total heat exchange capacity of the multi-split air-conditioning system, the pressure difference and distance between the two pressure measurement points on each air pipe, the pipe diameter and friction factor of each air pipe, and the density of the heat exchange medium in each air pipe, calculating a heat exchange capacity of each indoor unit.

10 Claims, 2 Drawing Sheets

(51) Int. Cl.
| | | |
|---|---|---|
| *G01K 5/32* | (2006.01) | |
| *G01K 17/00* | (2006.01) | |
| *G01K 17/06* | (2006.01) | |
| *G05B 19/04* | (2006.01) | |
| *G05B 19/042* | (2006.01) | |
| *F24F 110/40* | (2018.01) | |
| *F24F 140/00* | (2018.01) | |
| *H01H 71/14* | (2006.01) | |

(52) U.S. Cl.
CPC ........... *G01K 17/06* (2013.01); *G05B 19/042* (2013.01); *F24F 2110/40* (2018.01); *F24F 2140/00* (2018.01); *F25B 2700/00* (2013.01); *F28F 2200/00* (2013.01); *F28F 2210/00* (2013.01); *G05B 2219/2614* (2013.01); *H01H 2071/147* (2013.01)

(58) Field of Classification Search
CPC ................. G01K 17/06; G05B 19/042; G05B 2219/2614; F25B 2700/00; F28F 2200/00; F28F 2700/00; H01H 2071/147
See application file for complete search history.

(56) References Cited

U.S. PATENT DOCUMENTS

| | | | | |
|---|---|---|---|---|
| 11,060,779 | B2 * | 7/2021 | Takenaka | ............... F25B 25/005 |
| 2013/0067944 | A1 * | 3/2013 | Kibo | ........................ F24F 11/56 |
| | | | | 62/157 |
| 2015/0027147 | A1 * | 1/2015 | Cur | .......................... F25B 49/02 |
| | | | | 62/126 |
| 2015/0034293 | A1 * | 2/2015 | Takayama | ............... F25B 49/02 |
| | | | | 165/207 |
| 2017/0198945 | A1 * | 7/2017 | Azuma | ..................... F24F 11/89 |
| 2023/0089608 | A1 * | 3/2023 | Ren | .......................... F24F 11/30 |
| | | | | 702/189 |

FOREIGN PATENT DOCUMENTS

| | | |
|---|---|---|
| CN | 106839340 A | 6/2017 |
| CN | 108344528 A | 7/2018 |
| CN | 109855245 A | 6/2019 |
| EP | 2 535 669 A2 | 12/2012 |

* cited by examiner

MULTI-SPLIT AIR-CONDITIONING SYSTEM, AND METHOD FOR CALCULATING HEAT EXCHANGE CAPACITY THEREOF

FIELD

The present disclosure belongs to the technical field of air conditioning, and specifically relates to a multi-connected air conditioning system and a method for calculating a heat exchange amount thereof.

BACKGROUND

With the continuous improvement of people's living standards, people have also raised higher and higher requirements on the living environment. In order to maintain a comfortable ambient temperature in medium-scaled and large-scaled places, a multi-connected air conditioning system has become an indispensable heat exchange device. Specifically, most of existing multi-connected air conditioning systems are composed of one outdoor unit and a plurality of indoor units. In order to facilitate users to manage operating conditions of the plurality of indoor units, it is often required to separately monitor the heat exchange amount of each indoor unit in the multi-connected air conditioning system. There are already many methods for calculating the heat exchange amount in the prior art. However, most of these methods for calculating the heat exchange amount are only applicable to an air conditioner composed of one indoor unit and one outdoor unit, and cannot calculate the heat exchange amount of each indoor unit in the multi-connected air conditioning system separately. In recent years, some methods for calculating the heat exchange amount can also calculate the heat exchange amount of each indoor unit in the multi-connected air conditioning system separately; however, these calculation methods all rely on measuring a temperature change amount of heat exchange water to realize the calculation of heat exchange amount; that is, these calculation methods are only applicable to water-cooled multi-connected air conditioning systems, and cannot calculate the heat exchange amount of each indoor unit in an air-cooled multi-connected air conditioning system.

Accordingly, there is a need in the art for a new multi-connected air conditioning system and a method for calculating a heat exchange amount thereof to solve the above problem.

SUMMARY

In order to solve the above-mentioned problem in the prior art, that is, to solve the problem that the existing methods for calculating the heat exchange amount cannot calculate the heat exchange amount of each indoor unit of the air-cooled multi-connected air conditioning system separately, the present disclosure provides a method for calculating a heat exchange amount of a multi-connected air conditioning system, the multi-connected air conditioning system including a plurality of indoor units, and two pressure measurement points being provided on an air pipe of each of the indoor units; the method for calculating the heat exchange amount including: obtaining a total heat exchange amount of the multi-connected air conditioning system; obtaining a pressure difference between the two pressure measurement points on each of the air pipes; obtaining a distance between the two pressure measurement points on each of the air pipes; obtaining a pipe diameter of each of the air pipes; obtaining a friction factor of each of the air pipes; obtaining a density of a heat exchange medium in each of the air pipes; and calculating the heat exchange amount of each of the indoor units according to the total heat exchange amount of the multi-connected air conditioning system, the pressure difference between the two pressure measurement points on each of the air pipes, the distance between the two pressure measurement points on each of the air pipes, the pipe diameter of each of the air pipes, the friction factor of each of the air pipes and the density of the heat exchange medium in each of the air pipes.

In a preferred technical solution of the above method for calculating the heat exchange amount of the multi-connected air conditioning system, the step of "calculating the heat exchange amount of each of the indoor units according to the total heat exchange amount of the multi-connected air conditioning system, the pressure difference between the two pressure measurement points on each of the air pipes, the distance between the two pressure measurement points on each of the air pipes, the pipe diameter of each of the air pipes, the friction factor of each of the air pipes and the density of the heat exchange medium in each of the air pipes" specifically includes: calculating a flow rate of the heat exchange medium in each of the air pipes according to the pressure difference between the two pressure measurement points on each of the air pipes, the distance between the two pressure measurement points on each of the air pipes, the pipe diameter of each of the air pipes, the friction factor of each of the air pipes, and the density of the heat exchange medium in each of the air pipes; and calculating a sum of the flow rates of the heat exchange media in all the air pipes according to the flow rate of the heat exchange medium in each of the air pipes; wherein the heat exchange amount of each of the indoor units is equal to a product of the total heat exchange amount of the multi-connected air conditioning system and the flow rate of the heat exchange medium in the air pipe of each of the indoor units divided by the sum of the flow rates of the heat exchange media in all the air pipes.

In a preferred technical solution of the above method for calculating the heat exchange amount of the multi-connected air conditioning system, the flow rate of the heat exchange medium in the air pipe is $$m_i = \sqrt{\frac{\Delta P_i \rho_i \pi^2 d_i^5}{8 f_i L_i}},$$

wherein $\Delta P_i$ is the pressure difference between the two pressure measurement points on the air pipe, $\rho_i$ is the density of the heat exchange medium in the air pipe, $d_i$ is the pipe diameter of the air pipe, $f_i$ is the friction factor of the air pipe, and $L_i$ is the distance between the two pressure measurement points on the air pipe.

In a preferred technical solution of the above method for calculating the heat exchange amount of the multi-connected air conditioning system, when the multi-connected air conditioning system is in a cooling mode, the step of "obtaining the total heat exchange amount of the multi-connected air conditioning system" specifically includes: obtaining a flow rate of a compressor of the multi-connected air conditioning system; obtaining a specific enthalpy of a heat exchange medium at an outlet of an outdoor unit of the multi-connected air conditioning system and a specific enthalpy of a heat exchange medium at a suction port of the compressor of the multi-connected air conditioning system; and calculating the total heat exchange amount of the multi-connected air conditioning system according to the flow rate of the compressor of the multi-connected air conditioning system, the specific enthalpy of the heat exchange medium at the outlet of the outdoor unit of the multi-connected air conditioning system, and the specific enthalpy of the heat exchange medium at the suction port of the compressor of the multi-connected air conditioning system.

In a preferred technical solution of the above method for calculating the heat exchange amount of the multi-connected air conditioning system, the total heat exchange amount of the multi-connected air conditioning system is equal to a product of the flow rate of the compressor of the multi-connected air conditioning system and a difference between the specific enthalpy of the heat exchange medium at the outlet of the outdoor unit of the multi-connected air conditioning system and the specific enthalpy of the heat exchange medium at the suction port of the compressor of the multi-connected air conditioning system.

In a preferred technical solution of the above method for calculating the heat exchange amount of the multi-connected air conditioning system, the flow rate of the compressor of the multi-connected air conditioning system is $m_c=f_r V \rho_c \eta$; wherein $f_r$ is a frequency of the compressor, V is a suction volume of the compressor, $\rho_c$ is a suction density of the compressor, and n is a volumetric efficiency of the compressor.

In a preferred technical solution of the above method for calculating the heat exchange amount of the multi-connected air conditioning system, when the multi-connected air conditioning system is in a heating mode, the step of "obtaining the total heat exchange amount of the multi-connected air conditioning system" specifically includes: obtaining a flow rate of a compressor of the multi-connected air conditioning system; obtaining a specific enthalpy of a heat exchange medium at a discharge port of the compressor of the multi-connected air conditioning system and a specific enthalpy of a heat exchange medium at an inlet of an electronic expansion valve of the multi-connected air conditioning system; and calculating the total heat exchange amount of the multi-connected air conditioning system according to the flow rate of the compressor of the multi-connected air conditioning system, the specific enthalpy of the heat exchange medium at the discharge port of the compressor of the multi-connected air conditioning system and the specific enthalpy of the heat exchange medium at the inlet of the electronic expansion valve of the multi-connected air conditioning system.

In a preferred technical solution of the above method for calculating the heat exchange amount of the multi-connected air conditioning system, the total heat exchange amount of the multi-connected air conditioning system is equal to a product of the flow rate of the compressor of the multi-connected air conditioning system and a difference between the specific enthalpy of the heat exchange medium at the discharge port of the compressor of the multi-connected air conditioning system and the specific enthalpy of the heat exchange medium at the inlet of the electronic expansion valve of the multi-connected air conditioning system.

In a preferred technical solution of the above method for calculating the heat exchange amount of the multi-connected air conditioning system, the flow rate of the compressor of the multi-connected air conditioning system is $m_c=f_r V \rho_c \eta$; wherein $f_r$ is a frequency of the compressor, V is a suction volume of the compressor, $\rho_c$ is a suction density of the compressor, and $\eta$ is a volumetric efficiency of the compressor.

The present disclosure also provides a multi-connected air conditioning system. The multi-connected air conditioning system includes a controller that is capable of executing the method for calculating the heat exchange amount described in any of the above preferred technical solutions.

It can be understood by those skilled in the art that in the technical solutions of the present disclosure, the multi-connected air conditioning system of the present disclosure includes a plurality of indoor units, two pressure measurement points are provided on the air pipe of each of the indoor units, and the method for calculating the heat exchange amount of the present disclosure includes: obtaining a total heat exchange amount of the multi-connected air conditioning system; obtaining a pressure difference between the two pressure measurement points on each of the air pipes; obtaining a distance between the two pressure measurement points on each of the air pipes; obtaining a pipe diameter of each of the air pipes; obtaining a friction factor of each of the air pipes; obtaining a density of a heat exchange medium in each of the air pipes; and calculating the heat exchange amount of each of the indoor units according to the total heat exchange amount of the multi-connected air conditioning system, the pressure difference between the two pressure measurement points on each of the air pipes, the distance between the two pressure measurement points on each of the air pipes, the pipe diameter of each of the air pipes, the friction factor of each of the air pipes and the density of the heat exchange medium in each of the air pipes. Through the method for calculating the heat exchange amount of the present disclosure, the flow rate of the heat exchange medium in each of the air pipes can be calculated according to the pressure difference between the two pressure measurement points on each of the air pipes, the distance between the two pressure measurement points on each of the air pipes, the pipe diameter of each of the air pipes, the friction factor of each of the air pipes, and the density of the heat exchange medium in each of the air pipes; the sum of the flow rates of the heat exchange media in the air pipes of all the indoor units can be obtained by summating the flow rates of the heat exchange media in all the air pipes, and a ratio of the flow rate of the heat exchange medium in the air pipe of the indoor unit and the sum of the flow rates of the heat exchange media in all the air pipes can represent a proportion of the flow rate of the heat exchange medium in each of the indoor units in the sum of the flow rates; a product of this proportion and the total heat exchange amount of the multi-connected air conditioning system is the heat exchange amount of the indoor unit. In other words, the present disclosure calculates the heat exchange amount of each indoor unit according to the total heat exchange amount of the multi-connected air conditioning system and the proportion of the flow rate of the heat exchange medium in each of the indoor units in the sum of the flow rates of the heat exchange media in all the indoor units; that is, the method for calculating the heat exchange amount of the present disclosure can be used to calculate the heat exchange amount of each of the indoor units in an air-cooled multi-connected air conditioning system, so that the user can separately monitor the heat exchange amount of each of the indoor units, which further enables the user to manage operating conditions of the indoor units according to the heat exchange amount of each of the indoor units.

Further, in the preferred technical solution of the present disclosure, by using the method for calculating the heat exchange amount of the present disclosure, the flow rate of the heat exchange medium in each of the air pipes is calculated according to the pressure difference between the two pressure measurement points on each of the air pipes, the distance between the two pressure measurement points on each of the air pipes, the pipe diameter of each of the air pipes, the friction factor of each of the air pipes, and the density of the heat exchange medium in each of the air pipes, which effectively overcomes the problem that it is difficult to measure the gas flow in the air conditioning system with the aid of an instrument; moreover, this calculation method is also advantageous for improving the accuracy of data, thereby effectively improving the accuracy of the calculation result of the heat exchange amount of each of the indoor units.

Further, in the preferred technical solution of the present disclosure, when the multi-connected air conditioning system is in the cooling mode, by using the method for calculating the heat exchange amount of the present disclosure, the total heat exchange amount of the multi-connected air conditioning system can be calculated according to the flow rate of the compressor of the multi-connected air conditioning system, the specific enthalpy of the heat exchange medium at the outlet of the outdoor unit of the multi-connected air conditioning system, and the specific enthalpy of the heat exchange medium at the suction port of the compressor of the multi-connected air conditioning system. It can be understood that a multi-connected air conditioning system usually has only one outdoor unit; namely, it has only one compressor. Therefore, in the present disclosure, by calculating the total heat exchange amount of the multi-connected air conditioning system according to the flow rate of the compressor, the specific enthalpy of the heat exchange medium at the outlet of the outdoor unit of the multi-connected air conditioning system and the specific enthalpy of the heat exchange medium at the suction port of the compressor of the multi-connected air conditioning system, not only the calculation process of the total heat exchange amount of the multi-connected air conditioning system can be effectively simplified, but also the total heat exchange amount obtained by this calculation method has high accuracy, thereby effectively improving the accuracy of the calculation result of the heat exchange amount of each of the indoor units.

Further, in the preferred technical solution of the present disclosure, when the multi-connected air conditioning system is in the heating mode, by using the method for calculating the heat exchange amount of the present disclosure, the total heat exchange amount of the multi-connected air conditioning system can be calculated according to the flow rate of the compressor of the multi-connected air conditioning system, the specific enthalpy of the heat exchange medium at the discharge port of the compressor of the multi-connected air conditioning system and the specific enthalpy of the heat exchange medium at the inlet of an electronic expansion valve of the multi-connected air conditioning system. It can be understood that a multi-connected air conditioning system usually has only one outdoor unit; namely, it has only one compressor. Therefore, in the present disclosure, by calculating the total heat exchange amount of the multi-connected air conditioning system according to the flow rate of the compressor, the specific enthalpy of the heat exchange medium at the discharge port of the compressor of the multi-connected air conditioning system and the specific enthalpy of the heat exchange medium at the inlet of an electronic expansion valve of the multi-connected air conditioning system, not only the calculation process of the total heat exchange amount of the multi-connected air conditioning system can be effectively simplified, but also the total heat exchange amount obtained by this calculation method has high accuracy, thereby effectively improving the accuracy of the calculation result of the heat exchange amount of each of the indoor units.

DETAILED DESCRIPTION

Figure 1:
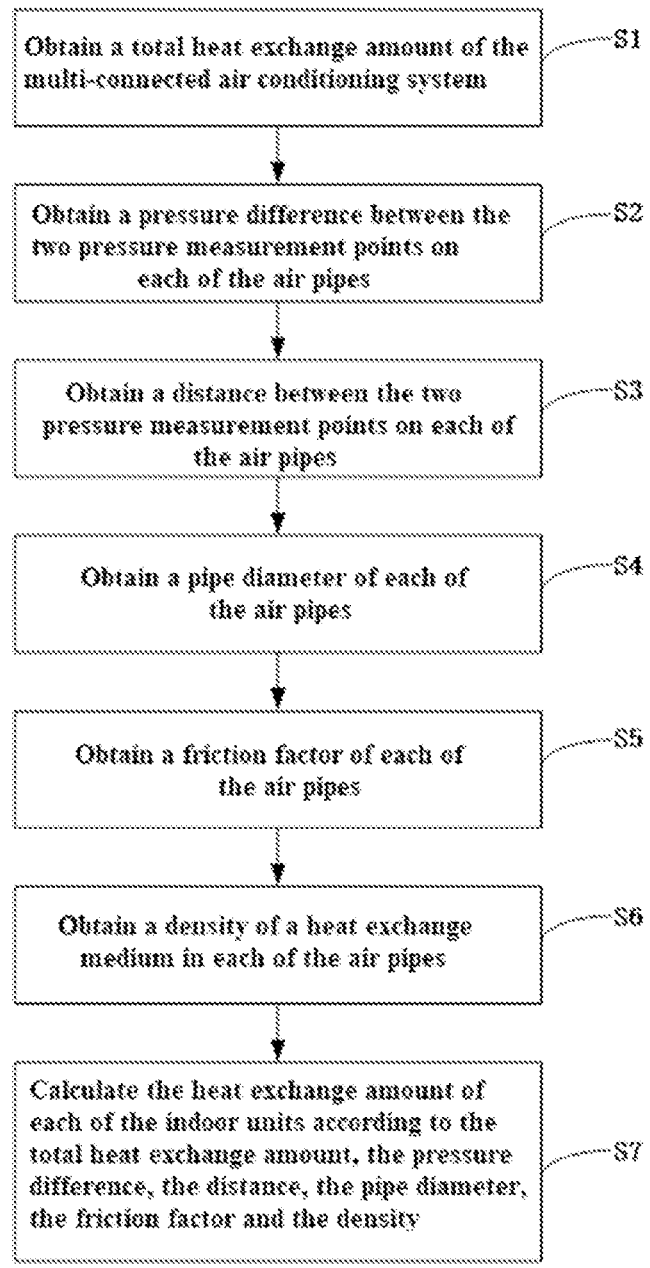
FIG. 1 is a flowchart of main steps of a method for calculating a heat exchange amount of the present disclosure.

Preferred embodiments of the present disclosure will be described below with reference to the drawings. It should be understood by those skilled in the art that these embodiments are only used to explain the technical principles of the present disclosure, and are not intended to limit the scope of protection of the present disclosure. For example, although various steps of the method of the present disclosure are described in specific orders in the present application, these orders are not limitative, and those skilled in the art can execute the steps in different orders without departing from the basic principles of the present disclosure.

It should be noted that in the description of the present disclosure, unless otherwise clearly specified and defined, terms "connect" and "connection" should be understood in a broad sense; for example, the connection may be a fixed connection, or may also be a detachable connection, or an integral connection; it may be a direct connection, or an indirect connection implemented through an intermediate medium, or it may be an internal communication between two elements. For those skilled in the art, the specific meaning of the above terms in the present disclosure can be understood according to specific situations. In addition, terms "first", "second", "third" and "fourth" are used for descriptive purpose only, and should not be construed as indicating or implying relative importance.

First, it should be noted that as a preferred embodiment of the present disclosure, the multi-connected air conditioning system includes one outdoor unit and a plurality of indoor units; of course, the multi-connected air conditioning system may also include a plurality of outdoor units, and those skilled in the art may set the specific numbers of the indoor units and the outdoor units by themselves as actually required for use. Specifically, in this preferred embodiment, an air pipe of each of the indoor units is provided with a pressure difference sensor. The pressure difference sensor usually includes two pressure sensors, and the two pressure sensors are respectively arranged at two pressure measurement points on the air pipe so that the multi-connected air conditioning system can directly obtain a pressure difference between the two pressure measurement points through the pressure difference sensor. At the same time, the air pipe of each of the indoor units is also provided with a gas density meter, and the multi-connected air conditioning system can obtain a density of a heat exchange medium in the air pipe through the gas density meter. In addition, it can be understood by those skilled in the art that in the present disclosure, it is also possible to arrange one pressure sensor at each of the two pressure measurement points so that the pressure difference between the two pressure measurement points can be automatically calculated by obtaining measurement data of the two pressure sensors; also, the density of the heat exchange medium in the air pipe may also be obtained in other ways in the present disclosure, that is, the present disclosure does not impose any restrictions on the way the multi-connected air conditioning system obtains basic parameters, and those skilled in the art may set it by themselves as actually required for use.

Further, in this preferred embodiment, the multi-connected air conditioning system further includes a first pressure sensor, a second pressure sensor and a third pressure sensor, as well as a first temperature sensor, a second temperature sensor, a third temperature sensor and a fourth temperature sensor; wherein the first pressure sensor is configured to measure a suction pressure of the compressor, and the first temperature sensor is configured to measure a suction temperature of the compressor; the second pressure sensor is configured to measure a discharge pressure of the compressor, and the second temperature sensor is configured to measure a discharge temperature of the compressor; the third pressure sensor is configured to measure a pressure at an outlet of the outdoor unit, and the third temperature sensor is configured to measure a temperature at the outlet the outdoor unit; and the fourth temperature sensor is configured to measure a temperature at an inlet of an electronic expansion valve. It should be noted that the present disclosure does not impose any restrictions on the specific structure of the multi-connected air conditioning system. The multi-connected air conditioning system may rely on its own sensors to obtain various basic data, or it may use external sensors to obtain various basic data, as long as the multi-connected air conditioning system can obtain the basic data required to be used in the method for calculating the heat exchange amount. In addition, it should also be noted that the heat exchange amount in the present disclosure is the heat exchange amount per unit time; that is, when the air conditioning system is in a cooling mode, the heat exchange amount refers to a cooling amount of the air conditioning system; and when the air conditioning system is in a heating mode, the heat exchange amount refers to a heating amount of the air conditioning system.

Furthermore, the multi-connected air conditioning system further includes a controller, which can obtain data detected by various sensors and which can also control operating conditions of various elements, thereby controlling the operating condition of the multi-connected air conditioning system. It can be understood by those skilled in the art that the present disclosure does not impose any restrictions on the specific structure and model of the controller, and the controller may be the original controller of the multi-connected air conditioning system, or it may be a controller separately provided to execute the method for calculating the heat exchange amount of the present disclosure. Those skilled in the art may set the structure and model of the controller by themselves as actually required for use.

First, reference is made to FIG. 1, which is a flowchart of main steps of a method for calculating a heat exchange amount of the present disclosure. As shown in FIG. 1, based on the multi-connected air conditioning system described in the above embodiment, the method for calculating the heat exchange amount of the present disclosure mainly includes the following steps:

S1: obtaining a total heat exchange amount of the multi-connected air conditioning system;
S2: obtaining a pressure difference between the two pressure measurement points on each of the air pipes;
S3: obtaining a distance between the two pressure measurement points on each of the air pipes;
S4: obtaining a pipe diameter of each of the air pipes;
S5: obtaining a friction factor of each of the air pipes;
S6: obtaining a density of a heat exchange medium in each of the air pipes; and
S7: calculating the heat exchange amount of each of the indoor units according to the total heat exchange amount of the multi-connected air conditioning system, the pressure difference between the two pressure measurement points on each of the air pipes, the distance between the two pressure measurement points on each of the air pipes, the pipe diameter of each of the air pipes, the friction factor of each of the air pipes and the density of the heat exchange medium in each of the air pipes.

Further, in step S1, the controller can obtain the total heat exchange amount of the multi-connected air conditioning system; it should be noted that the present disclosure does not impose any restrictions on the way the total heat exchange amount of the multi-connected air conditioning system is calculated, and those skilled in the art may calculate the total heat exchange amount of the multi-connected air conditioning system by using any calculation method in the prior art; namely, those skilled in the art may, according to the actual situation, choose the way the total heat exchange amount is calculated by themselves. Then, in step S2, the controller can separately obtain the pressure difference between the two pressure measurement points on each of the air pipes separately through the pressure difference sensor; of course, those skilled in the art may also obtain the pressure difference between the two pressure measurement points in other ways. In step S3, those skilled in the art may obtain the distance between the two pressure measurement points on each of the air pipes through a measurement tool such as a vernier caliper, and these measurement data may be sent to the controller. Of course, it is also possible for the controller to obtain the distance between the two pressure measurement points through a distance sensor. Such changes to the specific measurement method do not deviate from the basic principles of the present disclosure, and belong to the scope of protection of the present disclosure.

Further, in step S4, those skilled in the art may also obtain the pipe diameter of the air pipe through a measurement tool such as a vernier caliper, and these measurement data may be sent to the controller; of course, the present disclosure does not impose any restrictions on the way the controller obtains the pipe diameter of the air pipe. Then, in step S5, the controller can obtain the friction factor of each of the air pipes separately; it can be understood that there are many ways to obtain the friction factor of the air pipe, such as through experimental measurement, or through formula calculation. Those skilled in the art may choose the way of obtaining the friction factor by themselves as actually required for use, as long as the controller can obtain the friction factor of each of the air pipes. In step S6, the controller can obtain the density of the heat exchange medium in each of the air pipes through the gas density meter; of course, this way of obtaining the density is not limitative, and those skilled in the art may also choose other ways of obtaining the density by themselves as actually required for use, as long as the controller can obtain the density of the heat exchange medium in each of the air pipes. It can be understood by those skilled in the art that the order of executing steps S1 to S6 may be changed arbitrarily; that is, the present disclosure does not impose any restrictions on the order of obtaining the various basic parameters, and those skilled in the art may set the order of obtaining the various basic parameters by themselves as actually required for use, as long as the controller can obtain all the parameters required to be used.

Further, in step S7, the controller can calculate the heat exchange amount of each of the indoor units according to the total heat exchange amount of the multi-connected air conditioning system, the pressure difference between the two pressure measurement points on each of the air pipes, the distance between the two pressure measurement points on each of the air pipes, the pipe diameter of each of the air pipes, the friction factor of each of the air pipes and the density of the heat exchange medium in each of the air pipes. It can be understood by those skilled in the art that the present disclosure does not impose any restrictions on the specific calculation formula for calculating the heat exchange amount of each of the indoor units, as long as the calculation formula implements the calculation by using the total heat exchange amount of the multi-connected air conditioning system, the pressure difference between the two pressure measurement points on the air pipe of the indoor unit, the distance between the two pressure measurement points on the air pipe of the indoor unit, the pipe diameter of the air pipe of the indoor unit, the friction factor of the air pipe of the indoor unit and the density of the heat exchange medium in the air pipe of the indoor unit as basic parameters, which belongs to the scope of protection of the present disclosure. Namely, those skilled in the art may set the calculation formula by themselves according to the actual situation of the multi-connected air conditioning system.

Figure 2:
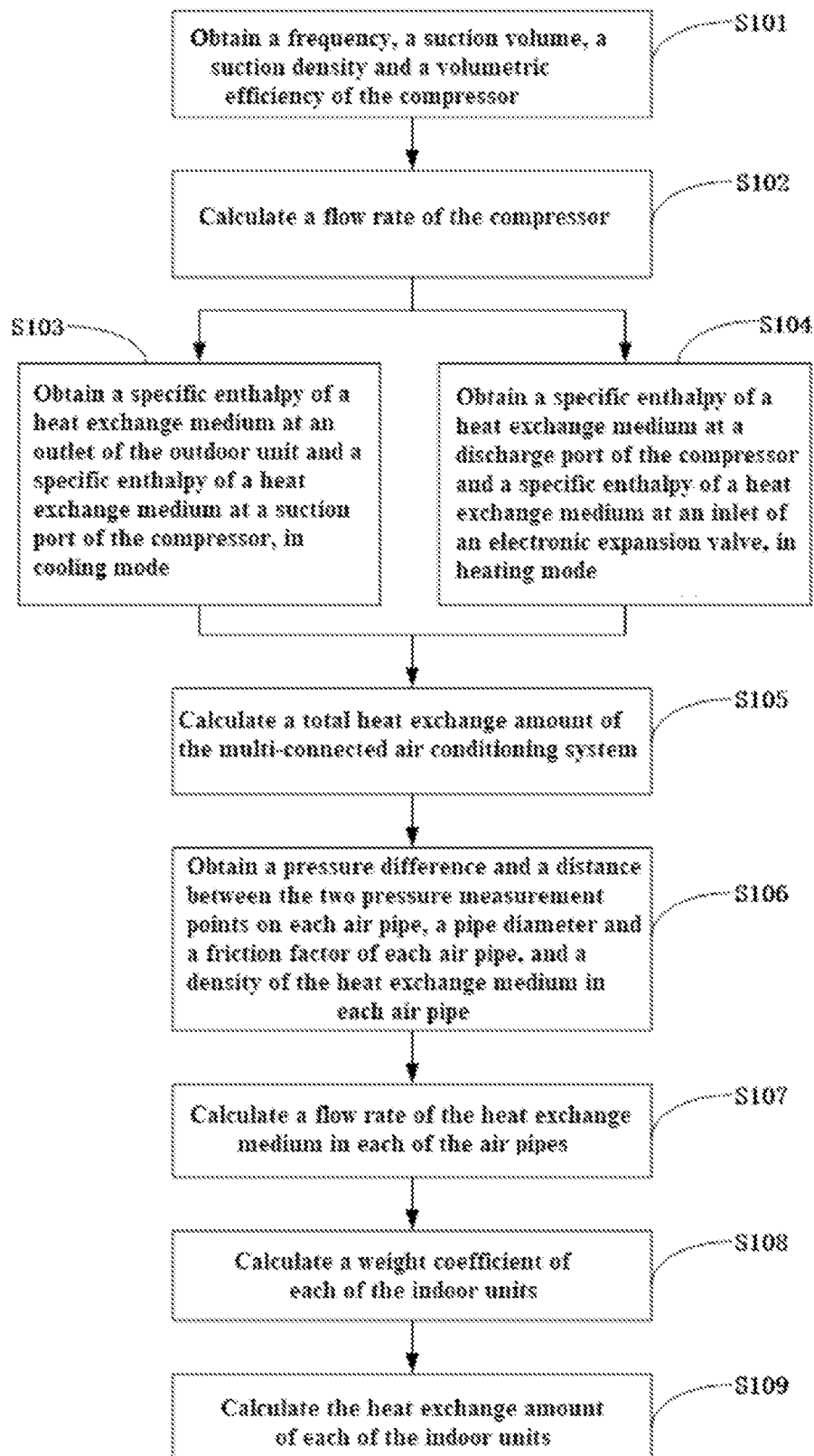
FIG. 2 is a flowchart of specific steps of a preferred embodiment of the present disclosure.

Next, reference is made to FIG. 2, which is a flowchart of specific steps of a preferred embodiment of the present disclosure; as shown in FIG. 2, based on the multi-connected air conditioning system described in the above embodiment, the preferred embodiment of the present disclosure specifically includes the following steps:

S101: obtaining a frequency, a suction volume, a suction density and a volumetric efficiency of the compressor;

S102: calculating a flow rate of the compressor;

S103: obtaining a specific enthalpy of a heat exchange medium at an outlet of the outdoor unit and a specific enthalpy of a heat exchange medium at a suction port of the compressor, when the multi-connected air conditioning system is in a cooling mode;

S104: obtaining a specific enthalpy of a heat exchange medium at a discharge port of the compressor and a specific enthalpy of a heat exchange medium at an inlet of an electronic expansion valve, when the multi-connected air conditioning system is in a heating mode;

S105: calculating a total heat exchange amount of the multi-connected air conditioning system;

S106: obtaining a pressure difference and a distance between the two pressure measurement points on each of the air pipes, a pipe diameter and a friction factor of each of the air pipes, and a density of the heat exchange medium in each of the air pipes;

S107: calculating a flow rate of the heat exchange medium in each of the air pipes;

S108: calculating a weight coefficient of each of the indoor units; and

S109: calculating the heat exchange amount of each of the indoor units.

Further, in step S101, the controller can obtain the frequency $f_r$, the suction volume V, the suction density $\rho_c$, and the volumetric efficiency n of the compressor; wherein the frequency $f_r$ and the suction volume V can be obtained from factory information of the compressor; the controller can obtain the suction pressure of the compressor through the first pressure sensor, and obtain the suction temperature of the compressor through the first temperature sensor; the controller can calculate the suction density $\rho_c$ of the compressor through the suction pressure and suction temperature of the compressor; the volumetric efficiency η of the compressor can be fitted automatically according to experimental data. Since the efficiencies η of different compressors are usually different, those skilled in the art need to set the calculation method of the volumetric efficiency η by themselves according to specific conditions of the compressor. In addition, it can be understood by those skilled in the art that the ways of obtaining the parameters described in this embodiment are only preferred implementations, and are not limitative descriptions. Those skilled in the art may also obtain the frequency $f_r$, the suction volume V, the suction density $\rho_c$ and the volumetric efficiency η of the compressor in other ways.

Further, in step S102, the controller can calculate the flow rate me of the compressor according to the frequency $f_r$, the suction volume V, the suction density pc, and the volumetric efficiency η of the compressor, wherein the flow rate me of the compressor is:

$$m_c = f_r V \rho_c \eta;$$

wherein the unit of the flow rate me is kg/s; the unit of the frequency $f_r$ is Hz; the unit of the suction volume V is m³; and the unit of the suction density $\rho_c$ is kg/m³.

It should be noted that this calculation method is only exemplary, and those skilled in the art may also set other calculation formulas by themselves according to the actual situation; for example, those skilled in the art may also add some correction coefficients to the above calculation formula. Such changes to the specific calculation method do not deviate from the basic principles of the present disclosure, and belong to the scope of protection of the present disclosure.

Furthermore, in step S103, when the multi-connected air conditioning system is in the cooling mode, the controller can obtain the specific enthalpy hcout of the heat exchange medium at the outlet of the outdoor unit of the multi-connected air conditioning system and the specific enthalpy hsuc of the heat exchange medium at the suction port of the compressor of the multi-connected air conditioning system; it should be noted that the outlet of the outdoor unit may be at any point on a main pipeline used when the outdoor unit communicates with a plurality of indoor units, as long as the heat exchange medium flowing out of the outdoor unit has not yet been split. Then, in step S105, the controller can calculate the cooling amount when the multi-connected air conditioning system is in the cooling mode according to the flow rate me of the compressor, the specific enthalpy hcout of the heat exchange medium at the outlet of the outdoor unit of the multi-connected air conditioning system and the specific enthalpy hsuc of the heat exchange medium at the suction port of the compressor of the multi-connected air conditioning system:

$$Q_c = m_c(h\text{cout} - h\text{suc});$$

wherein the unit of the cooling amount $Q_c$ is W, the unit of the specific enthalpy hcout of the heat exchange medium at the outlet of the outdoor unit is kj/kg, and the unit of the specific enthalpy hsuc of the heat exchange medium at the suction port of the compressor is kj/kg.

It should be noted that this way of calculating the cooling amount is only exemplary, and those skilled in the art may also set other calculation formulas by themselves according to the actual situation; for example, those skilled in the art may also add some correction coefficients to the above calculation formula. Such changes to the specific calculation method do not deviate from the basic principles of the present disclosure, and belong to the scope of protection of the present disclosure.

Furthermore, in step S104, when the multi-connected air conditioning system is in the heating mode, the controller can obtain the specific enthalpy hdis of the heat exchange medium at the discharge port of the compressor of the multi-connected air conditioning system and the specific enthalpy hval of the heat exchange medium at the inlet of the electronic expansion valve of the multi-connected air conditioning system; it should be noted that the inlet of the electronic expansion valve in this preferred embodiment may be at any point near the inlet of the electronic expansion valve, as long as the specific enthalpy of the heat exchange medium at that point is close to the specific enthalpy of the heat exchange medium at the inlet of the electronic expansion valve. Next, in step S105, the controller can calculate the heating amount when the multi-connected air conditioning system is in heating cooling mode according to the flow rate me of the compressor, the specific enthalpy hdis of the heat exchange medium at the discharge port of the compressor of the multi-connected air conditioning system and the specific enthalpy hval of the heat exchange medium at the inlet of the electronic expansion valve of the multi-connected air conditioning system:

$$Q_h = m_c(h\text{dis} - h\text{val});$$

wherein the unit of the heating amount $Q_h$ is W, the unit of the specific enthalpy hdis of the heat exchange medium at the discharge port of the compressor is kj/kg, and the unit of the specific enthalpy hval of the heat exchange medium at the inlet of the electronic expansion valve is kj/kg.

It should be noted that this way of calculating the heating amount is only exemplary, and those skilled in the art may also set other calculation formulas by themselves according to the actual situation; for example, those skilled in the art may also add some correction coefficients to the above calculation formula. Such changes to the specific calculation method do not deviate from the basic principles of the present disclosure, and belong to the scope of protection of the present disclosure.

As a way of calculating the specific enthalpy of gas, for a gas at a pressure of P and a temperature of T, the specific enthalpy thereof is:

$$h = hvs + a0 + a1*(T+273.15)/(Ts+273.15) + a2*P/1000 + a3*(P/1000)^2 + a4*(T+273.15)/(Ts+273.15)*P/1000 + a5*(T+273.15)/(Ts+273.15)^2 + a6*(T+273.15)/(Ts+273.15)^3$$

wherein the unit of h is kj/kg; the unit of T and Ts is °C.; the unit of P is kPa; a0=−7193.961732; a1=19622.709195; a2=−94.704450; a3=0.389046; a4=−94.665122; a5=−17960.594235; a6=5530.407319; hvs is saturated gas specific enthalpy corresponding to the pressure P:

$$hvs = 1.1968310788*10^{-9}*P^3 - 1.1117338854*10^{-5}*P^2 + 2.8248788070*10^{-2}*P + 4.0484133760*102;$$

Ts is saturated gas temperature corresponding to the pressure P:

$$Ts = -6.45972*10^{-6}*p^2 + 4.76583*10^{-2}*p - 3.58652*10;$$

As a way of calculating the specific enthalpy of liquid, for a liquid at a temperature of T, the specific enthalpy thereof is:

$$h = 3.52875*10^{-9}*Ps^3 - 2.69764*10^{-5}*Ps^2 + 9.82272*10^{-2}*Ps + 1.35940*102;$$

$$Ps = 0.39047T^2 + 25.98066T + 779.73127;$$

wherein the unit of h is kj/kg; the unit of Ps is kPa; and the unit of T is °C.

It should be noted that this method of calculating the specific enthalpy of the heat exchange medium is only exemplary, and those skilled in the art may also fit other calculation formulas by themselves according to actual experimental data. Such changes to the calculation formula of the specific enthalpy of the heat exchange medium do not deviate from the basic principles of the present disclosure, and belong to the scope of protection of the present disclosure.

Further, in step S106, the controller can obtain the pressure difference $\Delta P_i$ between the two pressure measurement points on each of the air pipes, the distance $L_i$ between the two pressure measurement points on each of the air pipes, the pipe diameter $d_i$ of each of the air pipes, the friction factor $f_i$ of each of the air pipes, and the density $\rho_i$ of the heat exchange medium in each of the air pipes. These parameters are obtained in the same way as in the previous embodiment, so a repeated description will not be given herein.

Further, in step S107, the controller can calculate the flow rate of the heat exchange medium in each of the air pipes respectively according to the pressure difference $\Delta P_i$ between the two pressure measurement points on each of the air pipes, the distance $L_i$ between the two pressure measurement points on each of the air pipes, the pipe diameter $d_i$ of each of the air pipes, the friction factor $f_i$ of each of the air pipes, and the density $\rho_i$ of the heat exchange medium in each of the air pipes. Specifically, since:

$$\Delta P_i = f_i \frac{L_i}{d_i^5} \frac{16 m_i^2}{\pi^2} \frac{1}{2\rho_i},$$

the unit of the pressure difference $\Delta P_i$ is kPa, the unit of the distance $L_i$ and the pipe diameter $d_i$ is m, the unit of the density $\rho_i$ is kg/m³, and the unit of the flow rate $m_i$ is kg/s, so the flow rate of the heat exchange medium in each of the air pipes is:

$$m_i = \sqrt{\frac{\Delta P_i \rho_i \pi^2 d_i^5}{8 f_i L_i}}.$$

After the flow rate of the heat exchange medium in each of the air pipes is calculated, the sum of the flow rates of the heat exchange media can be obtained by summating the flow rates of the heat exchange media in all the air pipes. Therefore, in step S108, the weight coefficient of each of the indoor units is:

$$wcal, i = \frac{m_i}{\sum_{i=1}^{n} m_i},$$

wherein n is the total number of the indoor units.

It should be noted that although the sum of the flow rates of the heat exchange media in all the air pipes is theoretically the same as the flow rate of the compressor, it has been found after many experiments that in practical applications, the sum of the flow rates of the heat exchange media in all the air pipes is usually smaller than the flow rate of the compressor. In order to ensure the accuracy of the calculation results, the denominator used in the calculation of the weight coefficient of each of the indoor units is the sum of the flow rates of the heat exchange media in all the air pipes, so as to effectively ensure that the sum of the weight coefficients of all the indoor units is 1.

Further, in step S109, when the multi-connected air conditioning system is in the cooling mode, the cooling amount of each of the indoor units is:

$Q_{ci}=Q_c*wcal, i$, wherein the unit of $Q_{ci}$ is W.

Further, in step S109, when the multi-connected air conditioning system is in the heating mode, the heating amount of each of the indoor units is:

$Q_{hi}=Q_h*wcal, i$, wherein the unit of $Q_{hi}$ is W.

Finally, it should be noted that the above embodiments are all preferred implementations of the present disclosure, and are not intended to limit the scope of protection of the present disclosure. When applying the present disclosure in practice, those skilled in the art may appropriately add or delete some of steps as required, or modify the order among different steps. Such changes do not go beyond the basic principles of the present disclosure, and belong to the scope of protection of the present disclosure.

Hitherto, the preferred implementations of the present disclosure have been described in conjunction with the accompanying drawings, but it is easily understood by those skilled in the art that the scope of protection of the present disclosure is obviously not limited to these specific embodiments. Without departing from the principle of the present disclosure, those skilled in the art can make equivalent changes or replacements to relevant technical features, and the technical solutions after these changes or replacements will fall within the scope of protection of the present disclosure.

What is claimed is:

1. A method for calculating a heat exchange amount of a multi-connected air conditioning system, wherein the multi-connected air conditioning system comprises a plurality of indoor units each having an air pipe and a controller, wherein the air pipe is provided with a pressure difference sensor consisting of two pressure sensors which are respectively arranged at two pressure measurement points, and the air pipe of each of the indoor units is also provided with a gas density meter; the method for calculating the heat exchange amount comprising:

obtaining, through the controller, a total heat exchange amount of the multi-connected air conditioning system;

obtaining, through the pressure difference sensor, a pressure difference between the two pressure measurement points on each of the air pipes;

obtaining, through a measurement tool or a distance sensor, a distance between the two pressure measurement points on each of the air pipes;

obtaining, through a measurement tool, a pipe diameter of each of the air pipes;

obtaining a friction factor of each of the air pipes;

obtaining, through the gas density meter, a density of a heat exchange medium in each of the air pipes;

calculating, through the controller, the heat exchange amount of each of the indoor units according to the total heat exchange amount of the multi-connected air conditioning system, the pressure difference between the two pressure measurement points on each of the air pipes, the distance between the two pressure measurement points on each of the air pipes, the pipe diameter of each of the air pipes, the friction factor of each of the air pipes and the density of the heat exchange medium in each of the air pipes, thereby controlling the operating condition of the multi-connected air conditioning system.

2. The method for calculating the heat exchange amount according to claim 1, wherein calculating the heat exchange amount of each of the indoor units according to the total heat exchange amount of the multi-connected air conditioning system, the pressure difference between the two pressure measurement points on each of the air pipes, the distance between the two pressure measurement points on each of the air pipes, the pipe diameter of each of the air pipes, the friction factor of each of the air pipes and the density of the heat exchange medium in each of the air pipes comprises:

calculating a flow rate of the heat exchange medium in each of the air pipes according to the pressure difference between the two pressure measurement points on each of the air pipes, the distance between the two pressure measurement points on each of the air pipes, the pipe diameter of each of the air pipes, the friction factor of each of the air pipes, and the density of the heat exchange medium in each of the air pipes; and calculating a sum of the flow rates of the heat exchange media in all the air pipes according to the flow rate of the heat exchange medium in each of the air pipes;

wherein the heat exchange amount of each of the indoor units is equal to a product of the total heat exchange amount of the multi-connected air conditioning system and the flow rate of the heat exchange medium in the air pipe of each of the indoor units divided by the sum of the flow rates of the heat exchange media in all the air pipes.

3. The method for calculating the heat exchange amount according to claim 2, wherein the flow rate of the heat exchange medium in the air pipe is $$m_i = \sqrt{\frac{\Delta P_i \rho_i \pi^2 d_i^5}{8 f_i L_i}},$$

and wherein $\Delta P_i$ is the pressure difference between the two pressure measurement points on the air pipe, $\rho_i$ is the density of the heat exchange medium in the air pipe, $d_i$ is the pipe diameter of the air pipe, $f_i$ is the friction factor of the air pipe, and $L_i$ is the distance between the two pressure measurement points on the air pipe.

4. The method for calculating the heat exchange amount according to claim 1, wherein when the multi-connected air conditioning system is in a cooling mode, the obtaining the total heat exchange amount of the multi-connected air conditioning system comprises:

obtaining a flow rate of a compressor of the multi-connected air conditioning system;

obtaining a specific enthalpy of a heat exchange medium at an outlet of an outdoor unit of the multi-connected air conditioning system and a specific enthalpy of a heat exchange medium at a suction port of the compressor of the multi-connected air conditioning system; and calculating the total heat exchange amount of the multi-connected air conditioning system according to the flow rate of the compressor of the multi-connected air conditioning system, the specific enthalpy of the heat exchange medium at the outlet of the outdoor unit of the multi-connected air conditioning system, and the specific enthalpy of the heat exchange medium at the suction port of the compressor of the multi-connected air conditioning system.

5. The method for calculating the heat exchange amount according to claim 4, wherein the total heat exchange amount of the multi-connected air conditioning system is equal to a product of the flow rate of the compressor of the multi-connected air conditioning system and a difference between the specific enthalpy of the heat exchange medium at the outlet of the outdoor unit of the multi-connected air conditioning system and the specific enthalpy of the heat exchange medium at the suction port of the compressor of the multi-connected air conditioning system.

6. The method for calculating the heat exchange amount according to claim 5, wherein the flow rate of the compressor of the multi-connected air conditioning system is $m_c = f_r V \rho_c \eta$; and wherein $f_r$ is a frequency of the compressor, V is a suction volume of the compressor, $\rho_c$ is a suction density of the compressor, and n is a volumetric efficiency of the compressor.

7. The method for calculating the heat exchange amount according to claim 1, wherein when the multi-connected air conditioning system is in a heating mode, the obtaining the total heat exchange amount of the multi-connected air conditioning system comprises:
obtaining a flow rate of a compressor of the multi-connected air conditioning system;
obtaining a specific enthalpy of a heat exchange medium at a discharge port of the compressor of the multi-connected air conditioning system and a specific enthalpy of a heat exchange medium at an inlet of an electronic expansion valve of the multi-connected air conditioning system; and
calculating the total heat exchange amount of the multi-connected air conditioning system according to the flow rate of the compressor of the multi-connected air conditioning system, the specific enthalpy of the heat exchange medium at the discharge port of the compressor of the multi-connected air conditioning system and the specific enthalpy of the heat exchange medium at the inlet of the electronic expansion valve of the multi-connected air conditioning system.

8. The method for calculating the heat exchange amount according to claim 7, wherein the total heat exchange amount of the multi-connected air conditioning system is equal to a product of the flow rate of the compressor of the multi-connected air conditioning system and a difference between the specific enthalpy of the heat exchange medium at the discharge port of the compressor of the multi-connected air conditioning system and the specific enthalpy of the heat exchange medium at the inlet of the electronic expansion valve of the multi-connected air conditioning system.

9. The method for calculating the heat exchange amount according to claim 8, wherein the flow rate of the compressor of the multi-connected air conditioning system is $m_c = f_r V \rho_c \eta$; and wherein $f_r$ is a frequency of the compressor, V is a suction volume of the compressor, $\rho_c$ is a suction density of the compressor, and $\eta$ is a volumetric efficiency of the compressor.

10. A multi-connected air conditioning system, comprising a controller that is capable of executing the method for calculating the heat exchange amount according to claim 1.

* * * * *